(12) United States Patent
Guthridge

(10) Patent No.: US 9,213,532 B2
(45) Date of Patent: Dec. 15, 2015

(54) METHOD FOR ORDERING TEXT IN A BINARY

(71) Applicant: Oracle International Corporation, Redwood Shores, CA (US)

(72) Inventor: Karsten Guthridge, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 14/037,760

(22) Filed: Sep. 26, 2013

(65) Prior Publication Data

US 2015/0089483 A1 Mar. 26, 2015

(51) Int. Cl.
*G06F 9/44* (2006.01)
*G06F 9/45* (2006.01)

(52) U.S. Cl.
CPC ............. *G06F 8/4441* (2013.01); *G06F 8/433* (2013.01)

(58) Field of Classification Search
CPC ........................................................ G06F 8/41
USPC .......................................................... 717/124
See application file for complete search history.

(56) References Cited

U.S. PATENT DOCUMENTS

| | | | |
|---|---|---|---|
| 5,500,948 A | 3/1996 | Hinton et al. | |
| 5,815,720 A | 9/1998 | Buzbee | |
| 6,260,131 B1 | 7/2001 | Kikuta et al. | |
| 6,298,411 B1 | 10/2001 | Giacalone | |
| 6,324,634 B1 | 11/2001 | Yoshioka et al. | |
| 6,772,315 B1 | 8/2004 | Perego | |
| 7,769,974 B2 | 8/2010 | Bhansali et al. | |
| 8,019,944 B1 | 9/2011 | Favor et al. | |
| 8,244,979 B2 | 8/2012 | Burns et al. | |
| 2004/0117592 A1 | 6/2004 | Day et al. | |
| 2006/0101299 A1 | 5/2006 | Chung | |
| 2006/0215481 A1* | 9/2006 | Dally et al. | ............... 365/233.5 |

(Continued)

FOREIGN PATENT DOCUMENTS

WO 2006098701 A1 9/2006

OTHER PUBLICATIONS

Pettis et al., Profile Guided Code Positioning, ACM (Published Jun. 20, 1990) retrieved from http://dl.acm.org/citation.cfm?id=93550 on Apr. 17, 2015.*

(Continued)

*Primary Examiner* — Don Wong
*Assistant Examiner* — Theodore Hebert
(74) *Attorney, Agent, or Firm* — Osha Liang LLP

(57) ABSTRACT

In general, in one aspect, embodiments of the invention relate to a method for generating executable binary. The method includes analyzing a test executable binary generated from source code, wherein the source code comprises a plurality of functions, generating, based on analyzing the test executable binary, a code call tree comprising a plurality of call durations for the plurality of functions, and determining, using the code call tree, a function order of the plurality of functions. The method further includes generating, using the function order, a call tree order map, generating a call tree ordered executable binary using the source code and the call tree order map, and executing the call tree ordered executable binary on a processor.

17 Claims, 11 Drawing Sheets

(56) References Cited

U.S. PATENT DOCUMENTS

| | | | |
|---|---|---|---|
| 2009/0254709 A1 | 10/2009 | Agesen | |
| 2011/0138363 A1* | 6/2011 | Schmelter et al. | 717/128 |
| 2011/0258416 A1* | 10/2011 | Moritz | 712/220 |
| 2012/0072423 A1* | 3/2012 | Morrison et al. | 707/739 |
| 2012/0144374 A1* | 6/2012 | Gallagher et al. | 717/128 |
| 2013/0111184 A1 | 5/2013 | Anvin et al. | |
| 2014/0096114 A1* | 4/2014 | Koren et al. | 717/128 |
| 2015/0089483 A1* | 3/2015 | Guthridge | 717/140 |

OTHER PUBLICATIONS

GNU, Options that Control Optimization, gnu.org (Published Apr. 8, 2012) retrieved from https://web.archive.org/web/20120408142734/http://gcc.gnu.org/onlinedocs/gcc-3.4.6/gcc/Optimize-Options.html on Apr. 17, 2015.*

"Compiler, Builder and Analyzer User Guide", Revised Dec. 10, 1996, http://www.ethoberon.ethz.ch/ethoberon/tutorial/Compiler.html (9 pages).

* cited by examiner

| Source Code 500 |
|---|
| Function A 502A |
| Function B 502B |
| Function C 502C |
| Function D 502D |
| Function E 502E |
| Function F 502F |
| Function G 502G |
| Function H 502H |
| Function I 502I |
| Function J 502J |
| Function K 502K |
| Function L 502L |
| Function M 502M |
| Function N 502N |
| Function P 502P |
| Function Q 502Q |
| Function R 502R |
| Function S 502S |
| Function T 502T |
| Function U 502U |
| Function V 502V |
| Function W 502W |
| Function X 502X |
| Function Y 502Y |
| Function Z 502Z |

*FIG. 5A*

Call Tree Order Map
506

| Function A 502A |
|---|
| Function G 502G |
| Function M 502M |
| Function L 502L |
| Function H 502H |
| Function F 502F |
| Function S 502S |
| Function N 502N |
| Function B 502B |
| Function D 502D |
| Function J 502J |
| Function I 502I |
| Function Q 502Q |
| Function R 502R |
| Function T 502T |
| Function V 502V |
| Function P 502P |
| Function U 502U |
| Function C 502C |
| Function K 502K |
| Function E 502E |
| Function W 502W |
| Function X 502X |
| Function Y 502Y |
| Function Z 502Z |

*FIG. 5C*

Code Call Tree Executable Binary 508

| |
|---|
| Binary for Function A 510A |
| Binary for Function G 510G |
| Binary for Function M 510M |
| Binary for Function L 510L |
| Binary for Function H 510H |
| Binary for Function F 510F |
| Binary for Function S 510S |
| Binary for Function N 510N |
| Binary for Function B 510B |
| Binary for Function D 510D |
| Binary for Function J 510J |
| Binary for Function I 510I |
| Binary for Function Q 510Q |
| Binary for Function R 510R |
| Binary for Function T 510T |
| Binary for Function V 510V |
| Binary for Function P 510P |
| Binary for Function U 510U |
| Binary for Function C 510C |
| Binary for Function K 510K |
| Binary for Function E 510E |
| Binary for Function W 510W |
| Binary for Function X 510X |
| Binary for Function Y 510Y |
| Binary for Function Z 510Z |

*FIG. 5D*

METHOD FOR ORDERING TEXT IN A BINARY

BACKGROUND

Computers are designed to execute computer programs written in a format understood by the computer, such as machine code. However, programmers typically do not write computer programs in machine code. Instead, programmers typically write computer programs using human readable programming languages referred to as source code. The resulting computer program is then compiled to generate a computer program in a format understood by the computer. The process of compilation is performed by a compiler. Compilers typically use the source code (e.g., computer program written in a human readable programming language) as input and generate object code, which is able to be transformed by another program into an executable (e.g., a format understood by the computer).

SUMMARY

In general, in one aspect, embodiments of the invention relate to a method for generating executable binary. The method includes analyzing a test executable binary generated from source code, wherein the source code comprises a plurality of functions, generating, based on analyzing the test executable binary, a code call tree comprising a plurality of call durations for the plurality of functions, and determining, using the code call tree, a function order of the plurality of functions. The method further includes generating, using the function order, a call tree order map, generating a call tree ordered executable binary using the source code and the call tree order map, and executing the call tree ordered executable binary on a processor.

In general, in one aspect, embodiments of the invention relate to a non-transitory computer-readable medium comprising software instructions that, when executed by a processor, perform a method for generating executable binary. The method includes analyzing a test executable binary generated from source code, wherein the source code comprises a plurality of functions, generating, based on analyzing the test executable binary, a code call tree comprising a plurality of call durations for the plurality of functions, and determining, using the code call tree, a function order of the plurality of functions. The method further includes generating, using the function order, a call tree order map, generating a call tree ordered executable binary using the source code and the call tree order map, and executing the call tree ordered executable binary on a processor.

In general, in one aspect, embodiments of the invention relate to a system for generating executable binary. The system includes an analyzer, a conversion engine, a call tree order linker, and a processor. The analyzer is configured to analyze a test executable binary generated from source code, wherein the source code comprises a plurality of functions, and generate, based on analyzing the test executable binary, a code call tree comprising a plurality of call durations for the plurality of functions. The conversion engine is configured to determine, using the code call tree, a function order of the plurality of functions, and generate, using the function order, a call tree order map. The call tree order linker is configured to generate a call tree ordered executable binary using the source code and the call tree order map. The processor is configured to execute the call tree ordered executable binary.

Other aspects of the invention will be apparent from the following description and the appended claims.

BRIEF DESCRIPTION OF DRAWINGS

FIGS. 5A-5F show an example in accordance with one or more embodiments of the invention.

DETAILED DESCRIPTION

Figure 1:
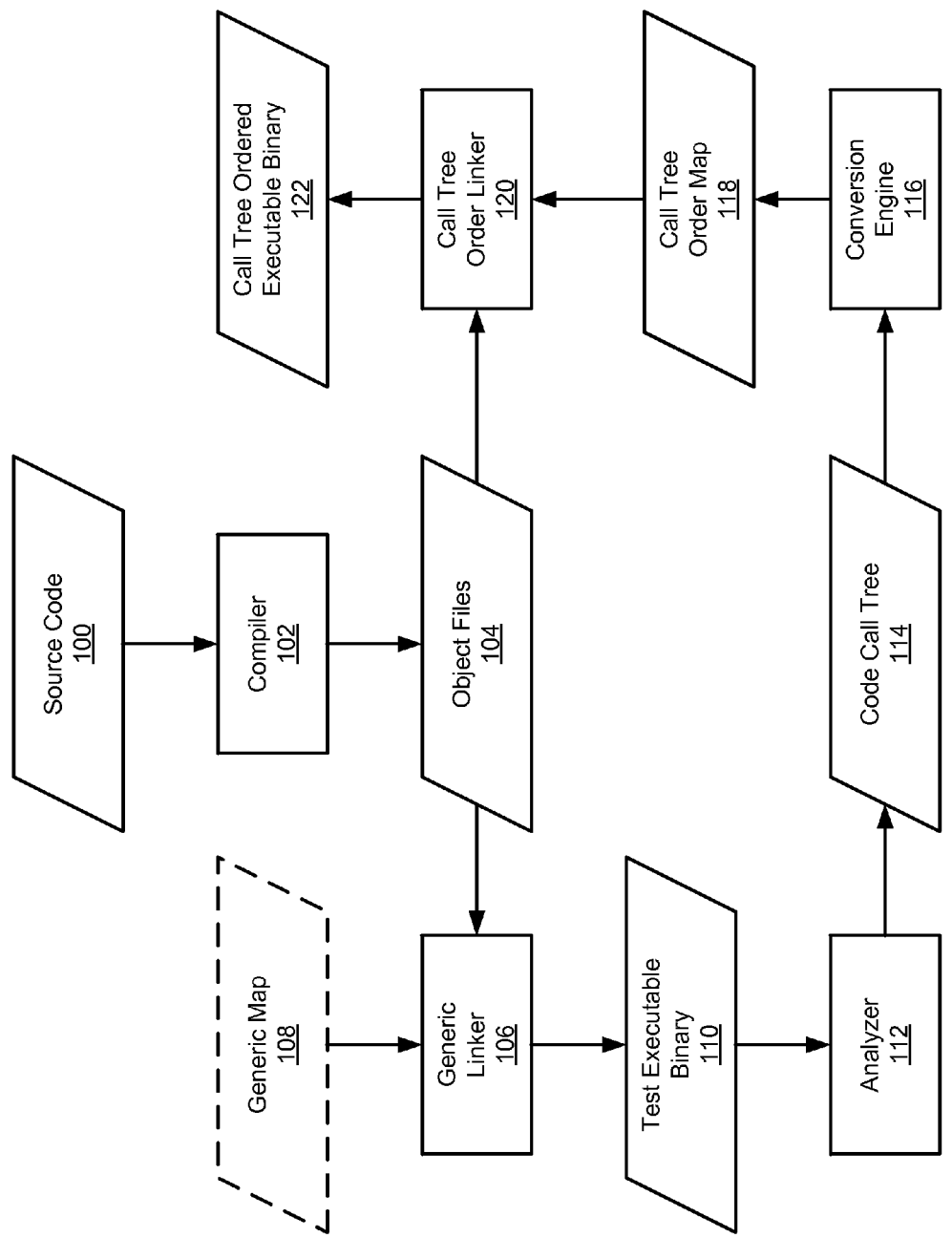
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for ordering text in a binary. Specifically, embodiments of the invention may be used to generate executable binary code from source code using a call tree ordered by the function execution time of a training program. Call tree ordered executable binaries may run more efficiently than executable binaries generated using other procedures.

FIG. 1 shows a diagram of a system in accordance with one or more embodiments of the invention. As shown in FIG. 1, the system converts source code (100) into call tree ordered executable binary (122). The compiler (102) that generates object files (104) from the source code (100). The generic linker (106) generates test executable binary (110) from the object files (104) and, optionally, a generic map (108). The analyzer (112) generates a code call tree (114) from the test executable binary (110). The conversion engine (116) generates a call tree order map (118) from the code call tree (114). The call tree order linker (120) generates the call tree ordered executable binary (122) from the object files (104) and the code call tree order map (118).

In one or more embodiments of the invention, source code (100) is a static file that includes uncompiled software instructions. Specifically, the source code (100) may be a set of uncompiled software instructions that have not been compiled into object files (104) by the compiler (102) or converted into executable binary (e.g., test executable binary (100), call tree ordered executable binary (122)) by a linker (e.g., generic linker (106), call tree order linker (120)). The source code (100) may be a set of software instructions that induce a computer to perform a task. In one or more embodiments of the invention, the source code (100) includes human-readable software instructions.

In one or more embodiments of the invention, call tree ordered executable binary (122) is a static file that includes software instructions in a form executable by hardware elements of a computer system (e.g., processor, etc.). Specifically, the call tree ordered executable binary (122) may be a set of compiled software instructions generated from object files (104) and a call tree order map (118). that has been compiled by the call tree compiler (100). Further, the call tree ordered executable binary (122) may include objects and functions that correspond to sets of software instructions of the source code (100). Such objects and functions may be arranged from the source code (100) so as to minimize the resources necessary to execute the call tree ordered executable binary (122) (e.g., to reduce execution time, etc.). The call tree ordered executable binary (122) may be executed by a processor.

In one or more embodiments of the invention, the source code (100) includes a number of functions. In one or more embodiments of the invention, a function is a callable unit/subset of the source code (100) that, once compiled linked, is executed as a unit (i.e., routine, subroutine, method, procedure, etc.). In one or more embodiments of the invention, a function is called (i.e., set for execution) by another function or by initializing the execution of the call tree ordered executable binary (122). Further, each function may call one or more other functions during its execution.

In one or more embodiments of the invention, the linkers (generic linker (106), call tree order linker (120)) are a processes or group of processes with functionality to generate executable binary (test executable binary (110), call tree ordered executable binary (122)) using the object files (104). In one or more embodiments of the invention, the linkers (generic linker (106), call tree order linker (120)) orders the functions from the source code (100) and object files (104) according to a map file (generic map (108), call tree order map (118)).

In one or more embodiments of the invention, the generic linker (106) generates the test executable binary (110) from the object files (104) without a map. Specifically, the generic linker (106) may generate the test executable binary (110) without purposefully reordering the functions from the object files (104). Alternatively, the generic linker (106) may use a generic map (108) to impart some order upon the functions from the object files (104). The generic map (108) may instruct the generic linker (106) to order the functions according to metrics obtainable from the object files (104) and/or the source code (100) (e.g., number of lines in a function, type of function, etc.).

In one or more embodiments of the invention, the analyzer (112) is a process or group of processes with functionality to generate a code call tree (114) for the object files (104). Specifically, the analyzer (112) may execute the test executable binary (110) to obtain run-time metrics about the test executable binary (110). Such run-time metrics may include, for example, time spent executing a function, number of threads generated during test-execution, virtual memory size, and amount of time spent waiting by the processor. The time spent executing a function may be referred to as the call duration of a function. The call duration may be measured as a percentage of total time spent executing the binary. In one or more embodiments of the invention, the call duration for the functions in the test executable binary (110) is measured by the analyzer (112) and stored in the code call tree (114).

In one or more embodiments of the invention, a code call tree (114) is a static file that relates functions to call duration. Specifically, the code call tree (114) stores the call durations for functions in the source code (100) indicating the call durations of each function called by other functions. For example, function A, while executing, may call function B or function C depending on the outcome of a variable comparison. The code call tree (114) in this example would indicate the call duration (in terms of percentage of total execution time) of function A, function B, and function C. Assuming no other functions, function A may have a call duration of 100% (i.e., the binary spent 100% of the execution time executing function A). The time spent executing function A is spent executing function B or executing function C. For example, (and discounting any time spent executing the code within function A that is not a part of function B or function C) during the execution of function A, 80% of the total execution time may have been spent executing function B (i.e., function B has a call duration of 80%), and 20% of the total execution time may have been spent executing function C (i.e., function C has a call duration of 20%).

Continuing with the example, assume further that function B may call function D or function E depending on a network metric. Function B has a call duration of 80% (i.e., 80% of the total execution time is spent executing function B). Half of the time spent executing function B is spent executing function D, and half is spent execution function E. Function D would have a call duration of 40% (i.e., 40% of the total execution time is spent executing function D). Function E would similarly have a call duration of 40% (i.e., 40% of the total execution time is spent executing function E).

Continuing with the example, assume that function C and function E each call the same function, function F, during their execution. Assume also that function C and function E only call function F (and no other functions) during their executions. Function F would, therefore, have a call duration under C of 20%, and a call duration under function E of 40%, for a total call duration of 60%.

In one or more embodiments of the invention, the conversion engine (116) is a process or group of processes with functionality to generate a call tree order map (118). In one or more embodiments of the invention, a call tree order map (118) is a static file that instructs the linker (118) regarding the order in which the compiled functions are to be arranged in the call tree ordered executable binary (122). In one or more embodiments of the invention, the conversion engine (116) generates the call tree order map (118) using the call durations stored in the code call tree (114). Specifically, the conversion engine (116) uses the call durations stored in the code call tree (114) to determine a function order that is stored in the call tree order map (118). In one or more embodiments of the invention, the conversion engine (116) generates the call tree order map (118) according to an ordering policy.

In one or more embodiments of the invention, an ordering policy is a set of rules for ordering functions in the call tree order map (118) to further a system goal. For example, an ordering policy with a system goal of minimizing the resources used by the call tree compiler may dictate that functions are ordered in the call tree order map (118) using the same order in which they appear in the source code (100). As another example, an ordering policy with a system goal of minimizing the resources used by executing the call tree ordered executable binary (122) may dictate that each function is immediately followed by the function it spends the greatest amount of time executing (i.e., the function with the highest call duration).

Figure 2:
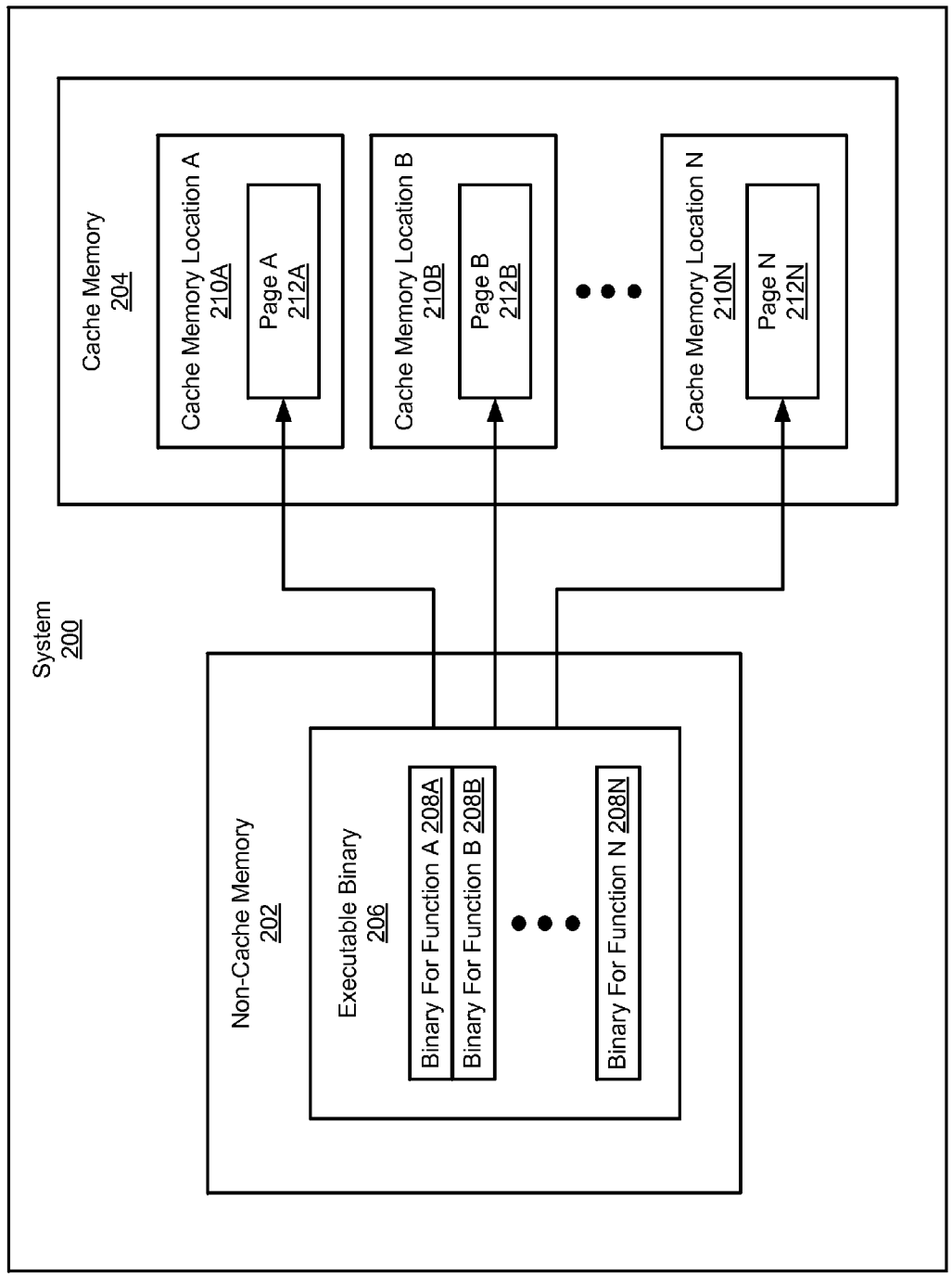
FIG. 2 shows a system in accordance with one or more embodiments of the invention.

FIG. 2 shows a system in accordance with one or more embodiments of the invention. Specifically, FIG. 2 shows executable binary code loaded into pages within cache memory. As shown in FIG. 2, the system (200) includes a non-cache memory (202) and a cache memory (204). The non-cache memory (202) includes executable binary (206). The executable binary (206) includes a number of binaries for functions (binary for function A (208A), binary for function B (208B), binary for function N (208N)) The cache memory (202) includes a number of cache memory locations (cache memory location A (210A), cache memory location B (210B), cache memory location N (210N)), each including a page (page A (212A), page B (212B), page N (212N)).

In one or more embodiments of the invention, cache memory (202) is memory from which instructions (i.e., portions of functions) are read and executed by the processor (not shown). In one or more embodiments of the invention, cache memory (204) is implemented as volatile memory (e.g., random access memory). In one or more embodiments of the invention, non-cache memory (202) is memory in which the executable binary (206) is stored prior to transfer into cache memory (204). In one or more embodiments of the invention, Non-cache memory (202) is implemented as volatile memory, non-volatile memory (e.g., persistent storage), or a combination of volatile memory and non-volatile memory. In one or more embodiments of the invention, the executable binary (206) is divided into pages that may be copied into the cache memory (206) as they are needed by the processor. In one or more embodiments of the invention, the size of the cache memory (204) is less than the size of the executable binary (206) (i.e., the cache memory (204) and on-chip translation lookaside buffer (TLB) is unable to store all pages which make up the executable binary (206) at one time).

In one or more embodiments of the invention, each page (page A (212A), page B (212B), page N (212N)) includes one or more binaries for functions (binary for function A (208A), binary for function B (208B), binary for function N (208N)) and/or a portion of one or more functions (binary for function A (208A), binary for function B (208B), binary for function N (208N)).

In one or more embodiments of the invention, a processor (not shown) may attempt to access the binary for a function (binary for function A (208A), binary for function B (208B), binary for function N (208N)) from the cache memory (204). Such access attempts may be made using a TLB. If the binary for the function requested by the processor is stored in a page currently loaded in cache memory (i.e., a page hit) or mapped by the TLB (i.e., a TLB hit), then it may be read immediately. If the binary for the function requested by the processor is stored in a page that is not currently loaded in cache memory (i.e., a page miss) or not mapped by the TLB (i.e., a TLB miss), then the page with the requested binary for function must be located in non-cache memory (202) and loaded into cache memory (204) or mapped by the TLB. Misses are expensive in terms of system resources, and the ordering policy implemented by a conversion engine (116 in FIG. 1) may be configured to increase efficiency by minimizing such misses.

Figure 3:
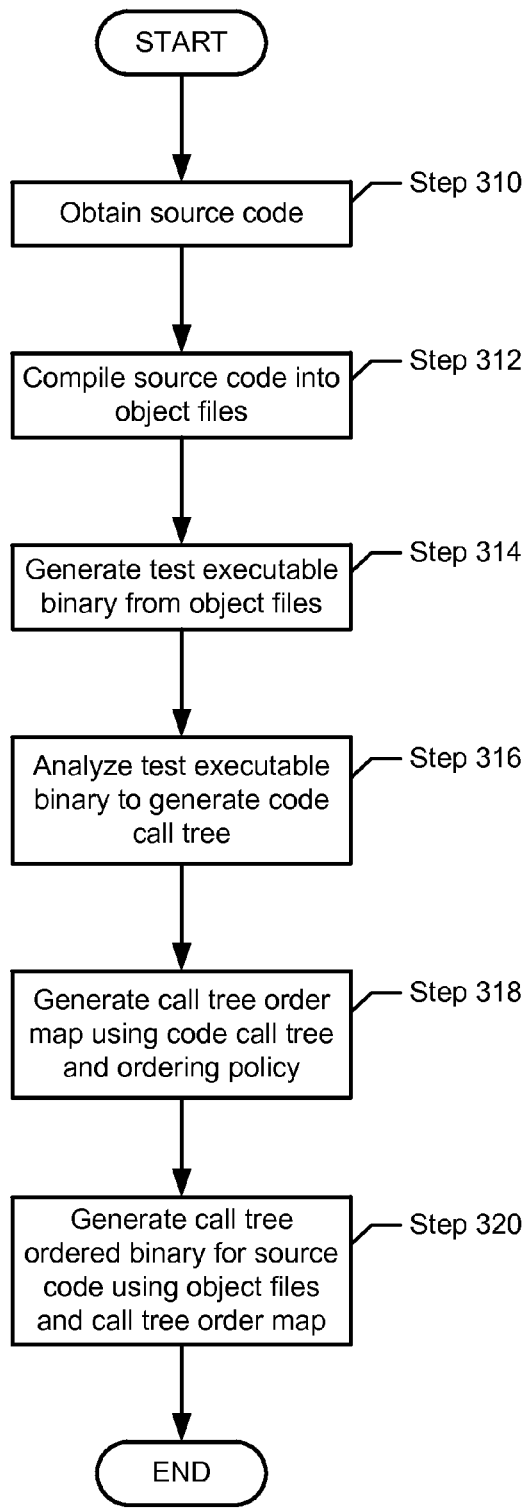
FIG. 3 shows a flow diagram in accordance with one or more embodiments of the invention.

FIG. 3 shows a flowchart for generating a call tree ordered executable binary in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 310, the compiler obtains the source code. In Step 312, the compiler compiles the source code into object files. In one or more embodiments of the invention, functions in the source code are compiled into object files as units. In Step 314, the generic linker generates test executable binary from the object files. In one or more embodiments of the invention, the generic linker uses a generic map to order the functions from the object file into the test executable binary.

In Step 316, the analyzer analyzes the test executable binary to generate a code call tree. In one or more embodiments of the invention, the analyzer test-executes the test executable binary to obtain a set of metrics about the test executable binary and stores the metrics in the code call tree.

In Step 318, the conversion engine generates the call tree order map using the code call tree and the ordering policy. In one or more embodiments of the invention, the conversion engine orders the functions in the call tree order map by applying an ordering policy to the metric data stored in the code call tree.

In one or more embodiments of the invention, the ordering policy implemented by the conversion engine is configured to reduce the number of misses by placing child functions with a higher call duration adjacent to the parent function and placing child functions with a lower call duration elsewhere in the call tree ordered executable binary. An ordering policy as described above may increase the likelihood that a called function will be stored on the same page or set of pages as the calling function, thus reducing misses by increasing the likelihood that a parent function currently loaded in cache memory will call a child function also currently loaded in cache memory.

In Step 320, the call tree order linker generates call tree ordered executable binary using the object files and the call tree order map. In one or more embodiments of the invention, functions in the source code are compiled into object files and binaries in the call tree ordered executable binary as units, and the compiled functions are ordered according to the call tree order map.

Figure 4:
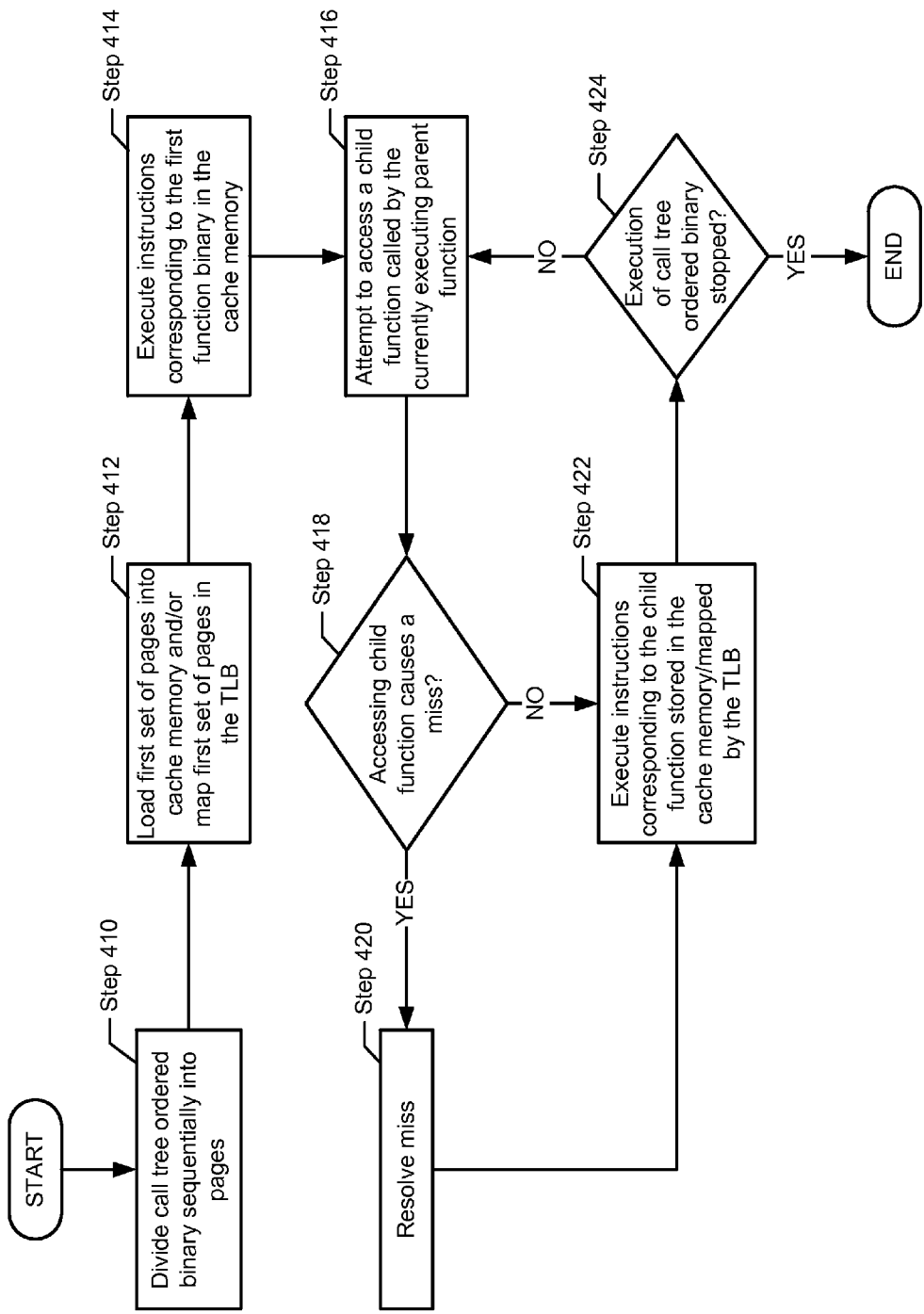
FIG. 4 shows a flow diagram in accordance with one or more embodiments of the invention.

FIG. 4 shows a flowchart for executing a call tree ordered executable binary in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 410, the call tree ordered executable binary is divided sequentially into pages. In Step 412, the first set of pages is loaded into cache memory and/or is mapped by the TLB. In Step 414, the processor executes the instructions corresponding to the first function binary in the cache memory. In Step 416, the processor attempts to access a child function called by the currently executing parent function.

In Step 418, the memory management unit determines whether the binary for the child function is stored in a page currently loaded in cache memory and/or is mapped by the TLB. If in Step 418, the memory management unit determines that the binary for the child function is not stored in a page currently loaded in cache memory and/or is not mapped by the TLB, and a miss has occurred, then in Step 420, the miss is resolved. In one or more embodiments of the invention, a page miss is resolved by loading the page containing the requested function binary into cache memory. In one or more embodiments of the invention, a TLB miss is resolved by calculating the mapping for the memory location containing the appropriate page and storing the mapping in the TLB.

If in Step 418, the memory management unit determines that the binary for the child function is stored in a page currently loaded in cache memory and/or is mapped by the TLB, and a hit has occurred, then in Step 422, the processor executes instructions corresponding to the binary for the called child function. In Step 424, the processor determines whether the execution of the call tree ordered executable binary has stopped (i.e., the application generated by the executing call tree ordered executable binary has been terminated by a user or system process). If in Step 424, the processor determines that the execution of the call tree ordered executable binary has not stopped, then the process returns to Step 416. If in Step 424, the processor determines that the execution of the call tree ordered executable binary has stopped, then the process ends.

Figure 5B:
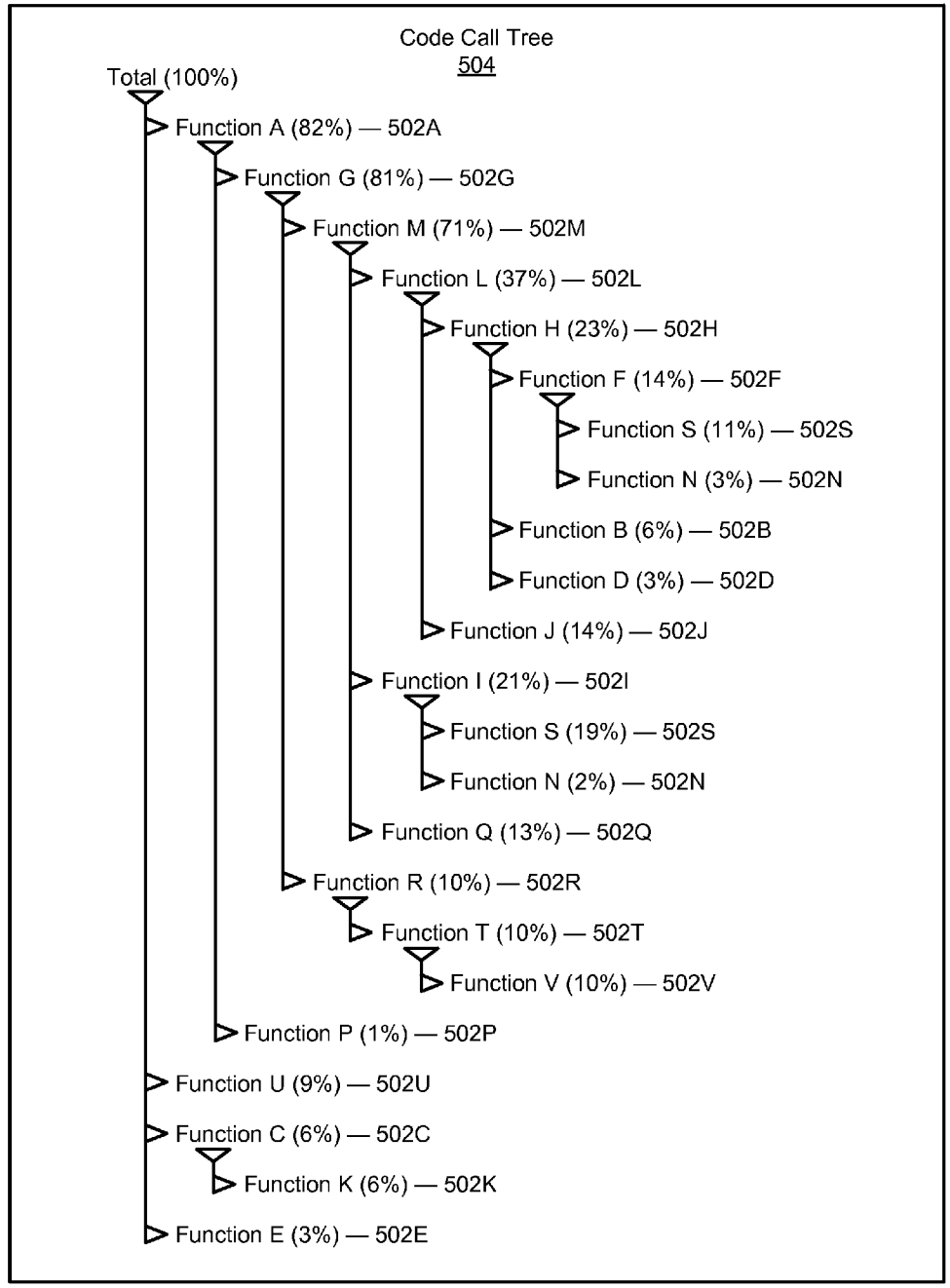

FIGS. 5A-5F show an example in accordance with one or more embodiments of the invention. Specifically, FIG. 5A shows a representation of source code (500) that includes 25 functions (function A (502A), function B (502B), function C (502C), function D (502D), function E (502E), function F (502F), function G (502G), function H (502H), function I (502I), function J (502J), function K (502K), function L (502L), function M (502M), function N (502N), function P (502P), function Q (502Q), function R (502R), function S (502S), function T (502T), function U (502U), function V (502V), function W (502W), function X (502X), function Y (502Y), function Z (502Z)). The functions within the source code are organized in the order shown (i.e., the order function A (502A), function B (502B), function C (502C), function D (502D), function E (502E), function F (502F), function G (502G), function H (502H), function I (502I), function J (502J), function K (502K), function L (502L), function M (502M), function N (502N), function P (502P), function Q (502Q), function R (502R), function S (502S), function T (502T), function U (502U), function V (502V), function W (502W), function X (502X), function Y (502Y), function Z (502Z)).

FIG. 5B shows an example code call tree in accordance with one or more embodiments of the invention. Specifically, FIG. 5C shows a visual representation of the relationship between functions and the call duration of each function. As shown in FIG. 5C, the code call tree (504) shows that during the execution of the initializing function, 82% of the execution time is spent executing function A (502A), 9% of the execution time is spent executing function U (502U), 6% of the execution time is spent executing function C (502C), and 3% of the execution time is spent executing and function E (502E).

During the execution of function A (502A), function A (502A) calls function G (502G) and function P (502P). Of the 82% of the total execution time spent executing function A (502A), 81% of the total execution time is spent executing function G (502G) and 19% of the execution time is spent executing function P (502P). When function C (502C) was called, function C (502C) called function K (502K) in every tested instance, and so function K (502K) has the same call duration (6%) as function C (502C).

Continuing with the discussion of FIG. 5C, of the 81% of the total execution time spent executing function G (502G) under function A (502A), 71% of the execution time is spent executing function M (502M) and 10% of the execution time is spent executing function R (502R). Of the 71% of the execution time is spent executing function M (502M) under function G (502G), 37% of the execution time is spent executing function L (502L), 21% of the execution time is spent executing function I (502I), and 13% of the execution time is spent executing function Q (502Q). Of the 10% of the execution time spent executing function R (502R), function R (502R) called function T (502T) in every tested instance, and so function T (502T) has a call duration of 10% under function R (502R). Of the 10% of the execution time spent executing function T (502T), function T (502T) called function V (502V) in every tested instance, and so function V (502V) has a call duration of 10% under function T (502T).

Continuing with the discussion of FIG. 5C, of the 37% of the total execution time spent executing function L (502L) under function M (502M), 23% of the execution time is spent executing function H (502H) and 14% of the execution time is spent executing function J (502J). Of the 21% of the total execution time spent executing function I (502I) under function M (502M), 19% of the execution time is spent executing function S (502S) and 2% of the execution time is spent executing function N (502N).

Continuing with the discussion of FIG. 5C, of the 23% of the total execution time spent executing function H (502H) under function L (502L), 14% of the execution time is spent executing function F (502F), 6% of the execution time is spent executing function B (502B), and 3% of the execution time is spent executing function D (502D). Of the 14% of the total execution time spent executing function F (502F) under function H (502H), 11% of the execution time is spent executing function S (502S) and 3% of the execution time is spent executing function N (502N). Function S (502S) and function N (502N) are called by both function I (502I) and by function F (502F), and so function S (502S) has a total execution time of 30% (19% under function I (502I) and 11% under function F (502F)), and function N (502N) has a total execution time of 5% (2% under function I (502I) and 3% under function F (502F)). Function W (502W), function X (502X), function Y (502Y), and function Z (502Z) are not called during the execution of the test executable binary.

For the purposes of the example, assume that the conversion engine implements an ordering policy configured to reduce the number of misses by placing the child functions with the highest call duration (under its parent function) adjacent to its parent function. The remaining functions are added after all functions under the child functions with higher call durations are added to the function order. If the function has previously been added, the function is not added a second time.

FIG. 5C shows an example call tree order map in accordance with one or more embodiments of the invention. Specifically, FIG. 5C shows a representation of a call tree order map (506) generated using the code call tree (504 in FIG. 5B) and the example ordering policy described above. The resulting call tree order map (506) indicates an order in which the functions should be placed in the executable binary. Specifically, the call tree order map (506) indicates that the functions should be placed in the order function A (502A), function G (502G), function M (502M), function L (502L), function H (502H), function F (502F), function S (502S), function N (502N), function B (502B), function D (502D), function J (502J), function I (502I), function Q (502Q), function R (502R), function T (502T), function V (502V), function P (502P), function U (502U), function C (502C), function K (502K), function E (502E), function W (502W), function X (502X), function Y (502Y), and function Z (502Z).

FIG. 5D shows an example code call tree executable binary in accordance with one or more embodiments of the invention. Specifically, FIG. 5D shows a representation of code call tree executable binary (508) generated by a call tree order linker using object code generated from the source code (500 in FIG. 5A) and the call tree order map (506 in FIG. 5C). As shown in FIG. 5D, the code call tree executable binary (508) shows the binary for each function in the source code (500 in FIG. 5A) in the order indicated in the call tree order map (506 in FIG. 5C). Specifically, the code call tree executable binary (508) shows the binary for each function in the following order: binary for function A (510A), binary for function G (510G), binary for function M (510M), binary for function L (510L), binary for function H (510H), binary for function F (510F), binary for function S (510S), binary for function N (510N), binary for function B (510B), binary for function D (510D), binary for function J (510J), binary for function I (510I), binary for function Q (510Q), binary for function R (510R), binary for function T (510T), binary for function V (510V), binary for function P (510P), binary for function U (510U), binary for function C (510C), binary for function K (510K), binary for function E (510E), binary for function W (510W), binary for function X (510X), binary for function Y (510Y), and binary for function Z (510Z).

Figure 5E:
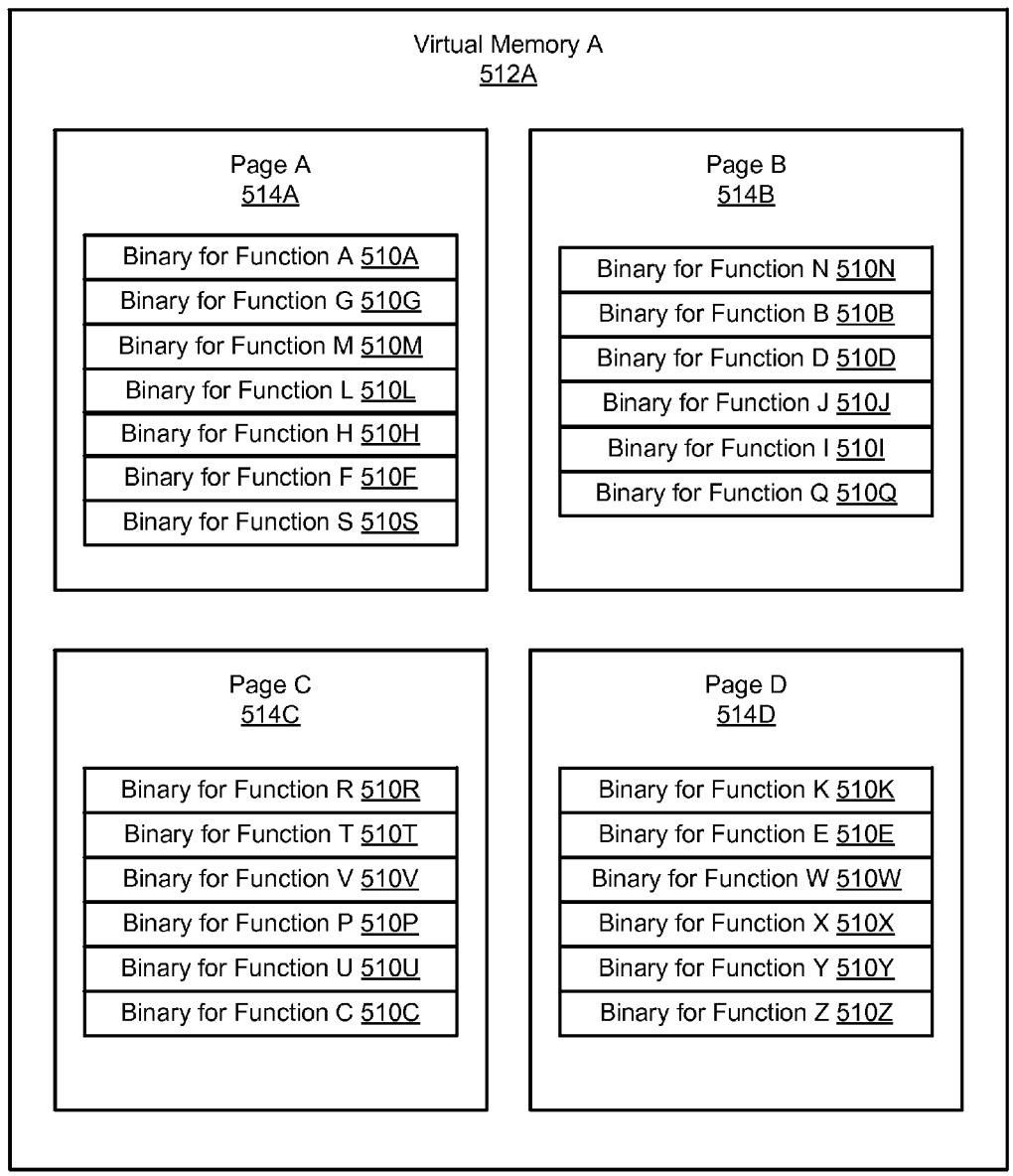
Figure 5F:
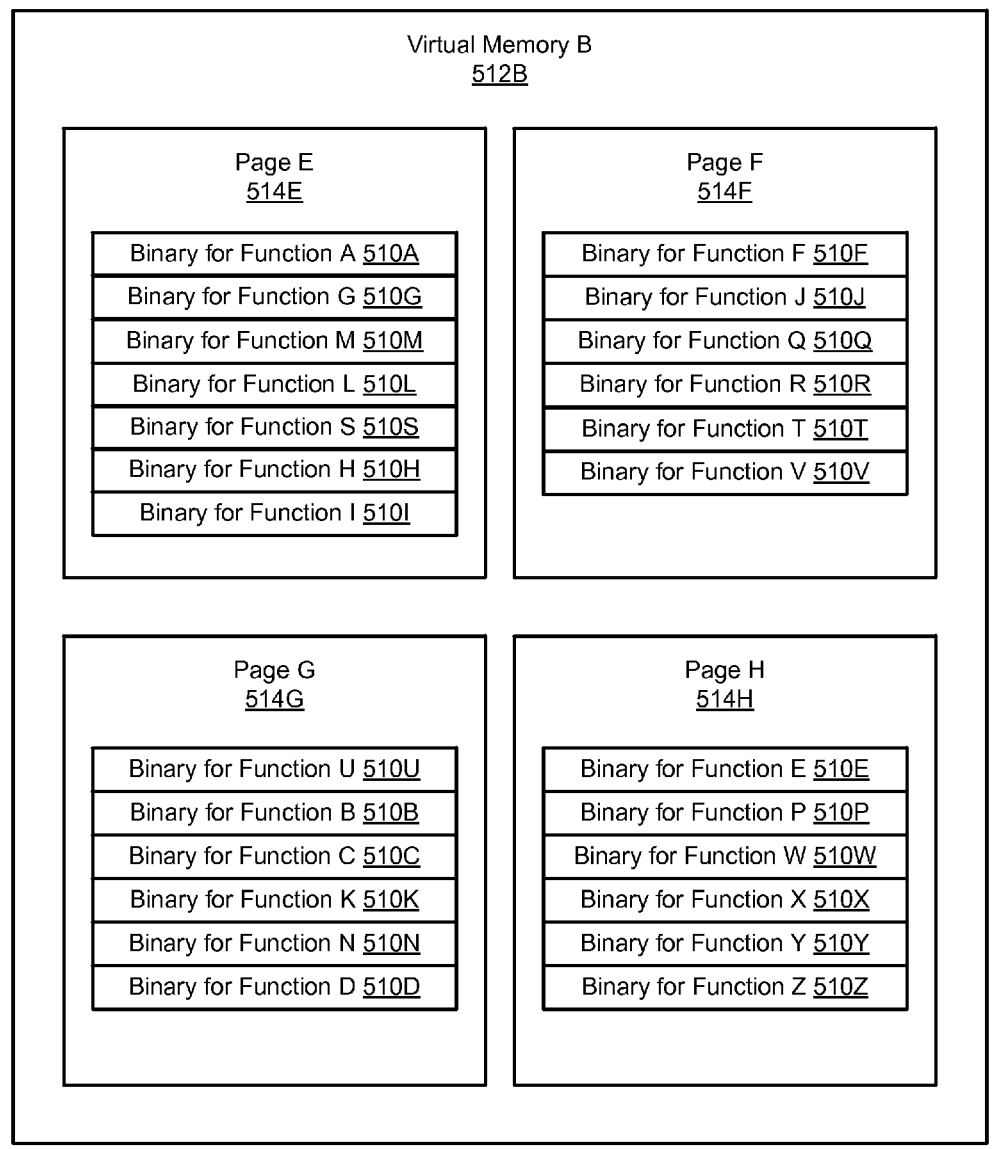

FIG. 5E shows example virtual memory for the code call tree executable binary (508 in FIG. 5D) in accordance with one or more embodiments of the invention. Specifically, FIG. 5E shows a representation of virtual memory A (512A) that has divided the code call tree executable binary (508 in FIG. 5D) sequentially into pages. As shown in FIG. 5F, page A (514A) includes binary for function A (510A), binary for function G (510G), binary for function M (510M), binary for function L (510L), binary for function H (510H), binary for function F (510F), and binary for function S (510S). Page B (514B) includes binary for function N (510N), binary for function B (510B), binary for function D (510D), binary for function J (510J), binary for function I (510I), and binary for function Q (510Q). Page C (514C) includes binary for function R (510R), binary for function T (510T), binary for function V (510V), binary for function P (510P), binary for function U (510U), and binary for function C (510C). Page D (514D) includes binary for function K (510K), binary for function E (510E), binary for function W (510W), binary for function X (510X), binary for function Y (510Y), and binary for function Z (510Z).

FIG. 5F shows another example for the code call tree executable binary (508 in FIG. 5D) (i.e., is not generated using a code call tree). Specifically, FIG. 5F shows a representation of the resulting virtual memory B (514B) from ordering the functions according to the amount of CPU usage time. As shown in FIG. 5F, virtual memory B (512B) includes page E (514E), page F (514F), page G (514G), and page H (514H). Page E (514E) includes binary for function A (510A), binary for function G (510G), binary for function M (510M), binary for function L (510L), binary for function S (510S), binary for function H (510H), and binary for function I (510I). Page F (510F) includes binary for function F (510F), binary for function J (510J), binary for function Q (510Q), binary for function R (510R), binary for function T (510T), and binary for function V (510V). Page G (514G) includes binary for function U (510U), binary for function B (510B), binary for function C (510C), binary for function K (510K), binary for function N (510N), and binary for function D (510D). Page H (514H) includes binary for function E (510E), binary for function P (510P), binary for function W (510W), binary for function X (510X), binary for function Y (510Y), and binary for function Z (510Z).

There is an increased likelihood that the next function called by the call tree ordered executable binary generated as shown in FIGS. 5B-5D (i.e., generated by a call tree order linker using a call tree order map) will be located on the same or adjacent page (as compared with the executable binary in FIG. 5F). For example, of the 23% of the total execution time spent executing function H (502H) under function L (502L), more than half (14%) of that execution time is spent executing function F (502F). Further, of the 14% of the total execution time spent executing function F (502F) under function H (502H), most (11%) of that execution time is spent executing function S (502S). As shown in FIG. 5E, binary for function H (510H), binary for function F (510F), and binary for function S (510S) are all on page A (514A). As shown in FIG. 5E, binary for function H (510H) and binary for function S (510S) are on page E (514E). However, binary for function F (510F) is on page F (514F). Although this example works only to illustrate a difference on a small scale, for large and complex executable binaries, such differences may increase exponentially.

Figure 6:
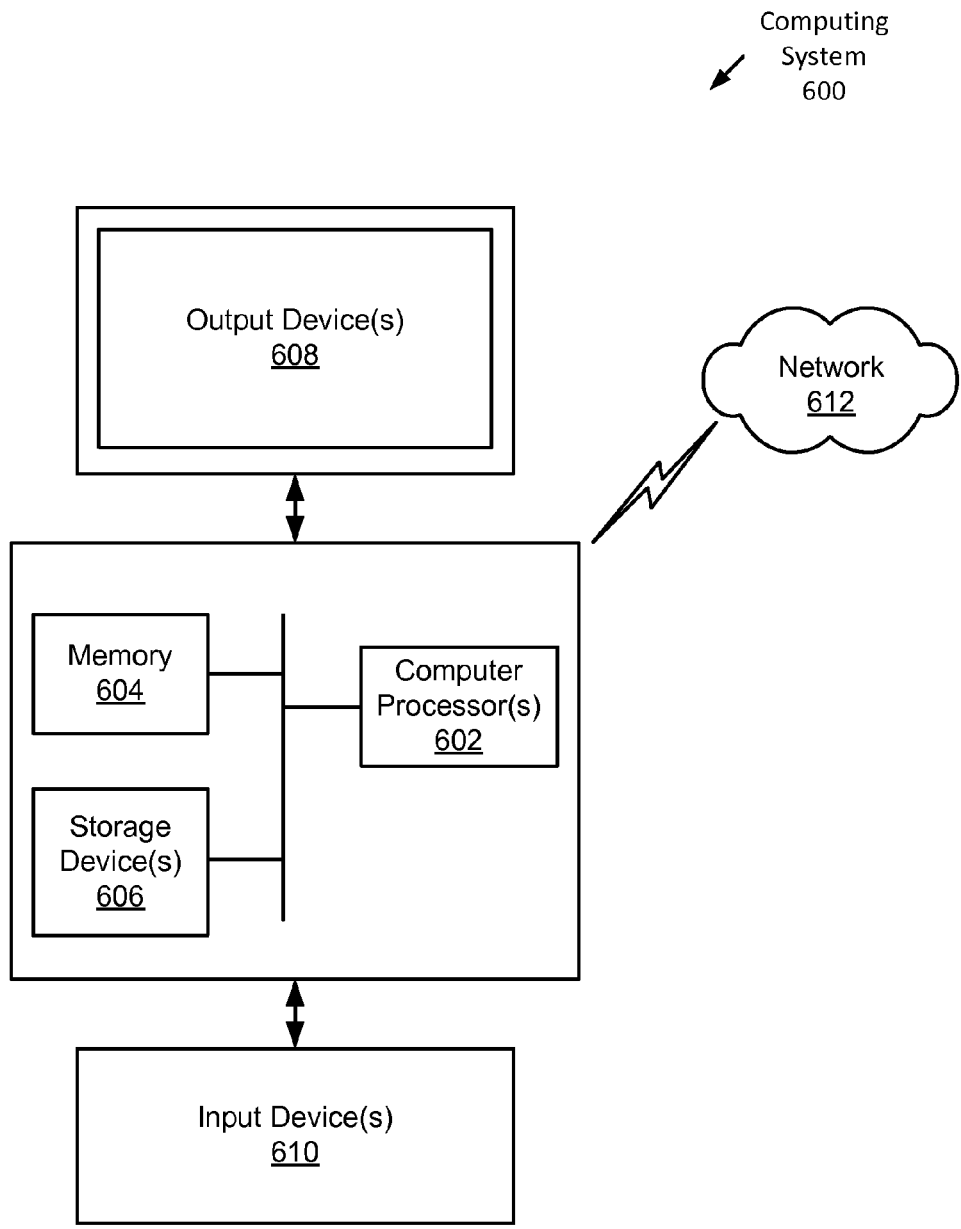
FIG. 6 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating executable binary comprising:
analyzing a test executable binary generated from source code, wherein the source code comprises a plurality of functions, and wherein the plurality of functions comprises a first function, a second function, and a third function;
generating, based on analyzing the test executable binary, a code call tree comprising a plurality of call durations for the plurality of functions, wherein the code call tree indicates that, while executing the first function, the second function has a higher call duration than the third function;
determining, using the code call tree, a function order of the plurality of functions;
generating, using the function order, a call tree order map;
generating a call tree ordered executable binary using the source code and the call tree order map, wherein generating the call tree ordered executable binary using the source code and the call tree order map comprises:
placing a binary for the second function after a binary for the first function and before a binary for the third function in the call tree ordered executable binary; and
executing the call tree ordered executable binary on a processor.

2. The method of claim 1, wherein the third function precedes the second function in the source code.

3. The method of claim 1, wherein executing the call tree ordered executable binary on the processor comprises:
generating a first set of pages comprising the binary for the first function and the binary for the second function;
generating a second set of pages comprising the binary for the third function;
storing the first set of pages in a cache memory for the processor; and
storing the second set of pages in a non-cache memory.

4. The method of claim 1, wherein analyzing the test executable binary indicates that the third function executes on the processor for a longer period of time than the second function executes on the processor.

5. The method of claim 1, wherein determining, using the code call tree, the function order of the plurality of functions comprises determining the function order using an ordering policy.

6. The method of claim 5,
wherein the ordering policy dictates that functions with greater call durations precede functions with lower call durations in the call tree ordered executable binary.

7. A non-transitory computer-readable medium comprising software instructions that, when executed by a processor, perform a method for generating executable binary comprising:
analyzing a test executable binary generated from source code, wherein the source code comprises a plurality of functions, and wherein the plurality of functions comprises a first function, a second function, and a third function;
generating, based on analyzing the test executable binary, a code call tree comprising a plurality of call durations for the plurality of functions, wherein the code call tree indicates that, while executing the first function, the second function has a higher call duration than the third function;
determining, using the code call tree, a function order of the plurality of functions;
generating, using the function order, a call tree order map;
generating a call tree ordered executable binary using the source code and the call tree order map, wherein generating the call tree ordered executable binary using the source code and the call tree order map comprises:
placing a binary for the second function after a binary for the first function and before a binary for the third function in the call tree ordered executable binary; and
executing the call tree ordered executable binary on a processor.

8. The non-transitory computer-readable medium of claim 7, wherein the third function precedes the second function in the source code.

9. The non-transitory computer-readable medium of claim 7, wherein executing the call tree ordered executable binary on the processor comprises:
generating a first set of pages comprising the binary for the first function and the binary for the second function;
generating a second set of pages comprising the binary for the third function;
storing the first set of pages in a cache memory for the processor; and
storing the second set of pages in a non-cache memory.

10. The non-transitory computer-readable medium of claim 7, wherein analyzing the test executable binary indicates that the third function executes on the processor for a longer period of time than the second function executes on the processor.

11. The non-transitory computer-readable medium of claim 7, wherein determining, using the code call tree, the function order of the plurality of functions comprises determining the function order using an ordering policy.

12. The non-transitory computer-readable medium of claim 11, wherein the ordering policy dictates that functions with greater call durations precede functions with lower call durations in the call tree ordered executable binary.

13. A system for generating executable binary comprising:
an analyzer configured to:
analyze a test executable binary generated from source code, wherein the source code comprises a plurality of functions, and wherein the plurality of functions comprises a first function, a second function, and a third function; and
generate, based on analyzing the test executable binary, a code call tree comprising a plurality of call durations for the plurality of functions, wherein the code call tree indicates that, while executing the first function, the second function has a higher call duration than the third function;
a conversion engine configured to
determine, using the code call tree, a function order of the plurality of functions; and
generate, using the function order, a call tree order map;
a call tree order linker configured to:
generate a call tree ordered executable binary using the source code and the call tree order map, wherein generating the call tree ordered executable binary using the source code and the call tree order map comprises:
placing a binary for the second function after a binary for the first function and before a binary for the third function in the call tree ordered executable binary; and
a processor configured to execute the call tree ordered executable binary.

14. The system of claim 13, wherein the third function precedes the second function in the source code.

15. The system of claim 13, wherein executing the call tree ordered executable comprises:
generating a first set of pages comprising the binary for the first function and the binary for the second function;
generating a second set of pages comprising the binary for the third function;
storing the first set of pages in a cache memory for the processor; and
storing the second set of pages in a non-cache memory.

16. The system of claim 13, wherein analyzing the test executable binary indicates that the third function executes on the processor for a longer period of time than the second function executes on the processor.

17. The system of claim 13, wherein determining, using the code call tree, the function order of the plurality of functions comprises determining the function order using an ordering policy.

\* \* \* \* \*